US006983275B2

(12) United States Patent
Koo et al.

(10) Patent No.: US 6,983,275 B2
(45) Date of Patent: Jan. 3, 2006

(54) OPTIMIZING DATABASE QUERY BY GENERATING, DETERMINING THE TYPE OF DERIVED PREDICATE BASED ON MONOTONICITY OF THE COLUMN GENERATING EXPRESSION FOR EACH REMAINING INEQUALITY PREDICATE IN THE LIST OF UNEXAMINED PREDICATES

(75) Inventors: Fred Koo, Thornhill (CA); Timothy Ray Malkemus, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 10/124,178

(22) Filed: Apr. 16, 2002

(65) Prior Publication Data

US 2003/0195881 A1    Oct. 16, 2003

(51) Int. Cl.
G06F 17/30    (2006.01)
(52) U.S. Cl. .............................. 707/5; 707/2; 707/102
(58) Field of Classification Search ................ 707/1–7, 707/100–104.1
See application file for complete search history.

(56) References Cited

U.S. PATENT DOCUMENTS

| | | | | |
|---|---|---|---|---|
| 5,495,600 | A | | 2/1996 | Terry et al. ..................... 707/3 |
| 5,787,411 | A | * | 7/1998 | Groff et al. ..................... 707/2 |
| 5,806,061 | A | * | 9/1998 | Chaudhuri et al. ............. 707/3 |
| 5,819,256 | A | * | 10/1998 | Ozbutun et al. ................ 707/2 |
| 5,920,716 | A | | 7/1999 | Johnson et al. ............. 717/141 |
| 5,924,088 | A | * | 7/1999 | Jakobsson et al. ............. 707/2 |
| 5,963,932 | A | * | 10/1999 | Jakobsson et al. ............. 707/2 |
| 6,088,524 | A | | 7/2000 | Levy et al. ..................... 707/3 |
| 6,105,018 | A | * | 8/2000 | Demers et al. ................ 707/2 |
| 6,363,371 | B1 | * | 3/2002 | Chaudhuri et al. ............. 707/2 |
| 6,381,616 | B1 | * | 4/2002 | Larson et al. ................ 707/201 |
| 6,385,603 | B1 | * | 5/2002 | Chen et al. ..................... 707/3 |
| 6,411,951 | B1 | * | 6/2002 | Galindo-Legaria et al. .... 707/3 |
| 6,438,541 | B1 | * | 8/2002 | Witkowski ..................... 707/4 |
| 6,442,543 | B1 | * | 8/2002 | Snodgrass et al. ............. 707/3 |
| 6,446,063 | B1 | * | 9/2002 | Chen et al. ..................... 707/4 |
| 6,457,020 | B1 | * | 9/2002 | Carey et al. ............ 707/103 R |

(Continued)

FOREIGN PATENT DOCUMENTS

EP        0616289 A1 *  2/1994

(Continued)

OTHER PUBLICATIONS

Yan-Nei Law et al. Blocking, Monotonicity, and turing completeness in a database langugage for sequences and streams, ABSTRACT only, one page.*

(Continued)

Primary Examiner—Srirama Channavajjala
(74) Attorney, Agent, or Firm—Sawyer Law Group LLP

(57) ABSTRACT

Database Management Systems (DBMS) manage data stored in tables and process database queries against that stored data. The database queries typically specify search conditions (that is, 'predicates') for qualifying database search results to be output by the DBMS. When a database table definition or query includes a given predicate having an expression that operates on a column of a table, it is useful to know whether the expression is monotonic. If the expression is determined to be monotonic, the present invention provides operations for deriving a new predicate from the given predicate for use in a new database query. Advantageously, the use of a new or derived predicate improves operational efficiency of the DBMS. Operation is provided for detecting a type of monotonicity related to the expression, and uses the detected type of monotonicity for generating the derived predicate.

10 Claims, 10 Drawing Sheets

U.S. PATENT DOCUMENTS

| | | | |
|---|---|---|---|
| 6,460,043 B1 * | 10/2002 | Tabbara et al. | 707/100 |
| 6,484,159 B1 * | 11/2002 | Mumick et al. | 707/2 |
| 6,513,029 B1 * | 1/2003 | Agrawal et al. | 707/2 |
| 6,581,052 B1 * | 6/2003 | Slutz | 707/2 |
| 6,598,041 B1 * | 7/2003 | Bernal et al. | 707/3 |
| 6,631,371 B1 * | 10/2003 | Lei et al. | 707/4 |
| 6,665,664 B2 * | 12/2003 | Paulley et al. | 707/4 |
| 6,694,305 B2 * | 2/2004 | Bernal et al. | 707/2 |
| 6,823,329 B2 * | 11/2004 | Kirk et al. | 707/2 |
| 6,882,995 B2 * | 4/2005 | Nasr et al. | 707/3 |
| 2002/0032678 A1 * | 3/2002 | Cornwell et al. | 707/3 |
| 2003/0212694 A1 * | 11/2003 | Potapov et al. | 707/100 |
| 2004/0030679 A1 * | 2/2004 | Gonnet | 707/3 |

FOREIGN PATENT DOCUMENTS

| | | |
|---|---|---|
| EP | 0689 148 A1 * | 5/1995 |
| EP | 0877327 A2 * | 11/1998 |

OTHER PUBLICATIONS

Jayadev Misra, Monotonicity, Stability and constants notes on UNITY: Oct. 1989.*

Sirish Chandrasekaran et al. "Streaming queries over streaming data", proceedings of the 28th VLDB conference, 200212 pages.*

Chun Zhang et al. "On supporting containment queries in relational daabase management systems", ACM SIGMOD May 2001 14 pages.*

Kapetanios,E et al. The design and implementation of a meaning driver data query language, Proceedings of the 14 internatin conference on scientific and statistical database management IEEE 2002, 4 pages.*

Q.Zhao et al. "Register Binding for DSP code containing predicated execution"ISBN:90-73461-18-9, STW, 1999, pp 611-617.*

Laks VS Lakshmanan et al. Optimization of constrained frequent set queries with 2-variable constraints, 199812 pages.*

Ashish Gupta et al. Efficient and complete tests for database integrity constraint checking, 1994, 6 pages.*

Joseph C et al. "On predicated execution", Hewlett Packard HPL-91-58, May 1991pp 1-25.*

Surajit Chaudhuri et al. "selectivity estimatiion for string predicates: Overcoming the underestimation problem", proceedings of the 20th international conference on data engineering (ICDE'04) Apr. 2004, pp 227-238.*

Oded Goldreich et al. "Testing monotonicity", foundations of computer science, 1998 proceedings 39th published on Nov. 1998, pp 426-435.*

Malkemus et al. "predicate derivation and monotonicity detectiion in DB2 UDB", proceedings of the 21st international conference on data engineering (ICDE 2005), Apr. 2005, pp 939-947.*

Vijay K Garg et al. "detecting conjunctive channel predicates in a distributed programming environment", proceedings of the 28th annual hawaii international conference on system sciences-1995, 1995 IEEE pp 232-241.*

Dave D Straube et al. "query optimization and execution plan generation in object-oriented data management systems", IEEE transactions on knowledge and data engineering, vol. 7, No. 2 Apr., 1995, pp 210-227.*

Bonner, Anthony J., "*Workflow Transactions and Datalog,*" University of Toronto, 1999, 294-305.

* cited by examiner

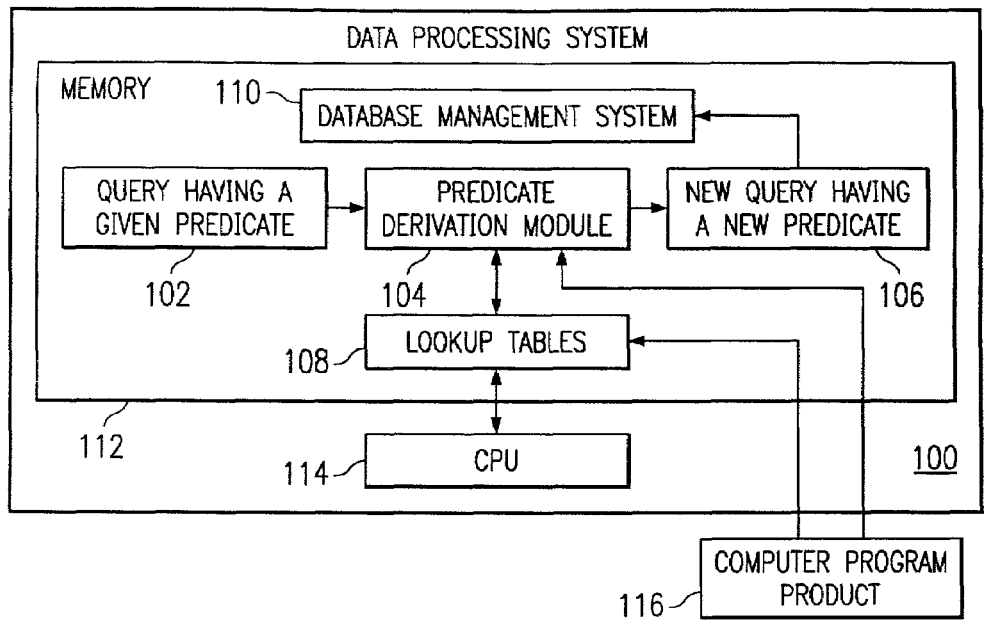

| | | 1 | 2 | 3 | 4 | 5 | 6 | 7 | 8 |
|---|---|---|---|---|---|---|---|---|---|
| | "+" | CPI | CPN | CNI | CNN | KP | KN | K* | U |
| 1 | CPI | CPI | CPN | U | U | CPI | CPI | CPI | U |
| 2 | CPN | CPN | CPN | U | U | CPN | CPN | CPN | U |
| 3 | CNI | U | U | CNI | CNN | CNI | CNI | CNI | U |
| 4 | CNN | U | U | CNN | CNN | CNN | CNN | CNN | U |
| 5 | KP | CPI | CPN | CNI | CNN | KP | K* | K* | U |
| 6 | KN | CPI | CPN | CNI | CNN | K* | KN | K* | U |
| 7 | K* | CPI | CPN | CNI | CNN | K* | K* | K* | U |
| 8 | U | U | U | U | U | U | U | U | U |

SUBTRACTION LOOKUP TABLE
204

202
ADDITION LOOKUP TABLE

| | | 1 | 2 | 3 | 4 | 5 | 6 | 7 | 8 |
|---|---|---|---|---|---|---|---|---|---|
| | "−" | CPI | CPN | CNI | CNN | KP | KN | K* | U |
| 1 | CPI | U | U | CPI | CPN | CPI | CPI | CPI | U |
| 2 | CPN | U | U | CPN | CPN | CPN | CPN | CPN | U |
| 3 | CNI | CNI | CNN | U | U | CNI | CNI | CNI | U |
| 4 | CNN | CNN | CNN | U | U | CNN | CNN | CNN | U |
| 5 | KP | CNI | CNN | CPI | CPN | K* | KP | K* | U |
| 6 | KN | CNI | CNN | CPI | CPN | KN | K* | K* | U |
| 7 | K* | CNI | CNN | CPI | CPN | K* | K* | K* | U |
| 8 | U | U | U | U | U | U | U | U | U |

MULTIPLICATION LOOKUP TABLE
302

|   |     | 1   | 2   | 3   | 4   | 5   | 6   | 7   | 8 |
|---|-----|-----|-----|-----|-----|-----|-----|-----|---|
|   | "*" | CPI | CPN | CNI | CNN | KP  | KN  | K*  | U |
| 1 | CPI | U   | U   | U   | U   | CPI | CNI | U   | U |
| 2 | CPN | U   | U   | U   | U   | CPN | CNN | U   | U |
| 3 | CNI | U   | U   | U   | U   | CNI | CPI | U   | U |
| 4 | CNN | U   | U   | U   | U   | CNN | CPN | U   | U |
| 5 | KP  | CPI | CPN | CNI | CNN | KP  | KN  | K*  | U |
| 6 | KN  | CNI | CNN | CPI | CPN | KN  | KP  | K*  | U |
| 7 | K*  | U   | U   | U   | U   | K*  | K*  | K*  | U |
| 8 | U   | U   | U   | U   | U   | U   | U   | U   | U |

DIVISION LOOKUP TABLE
304

|   |     | 1   | 2   | 3   | 4   | 5   | 6   | 7   | 8 |
|---|-----|-----|-----|-----|-----|-----|-----|-----|---|
|   | "/" | CPI | CPN | CNI | CNN | KP  | KN  | K*  | U |
| 1 | CPI | U   | U   | U   | U   | CPN | CNN | U   | U |
| 2 | CPN | U   | U   | U   | U   | CPN | CNN | U   | U |
| 3 | CNI | U   | U   | U   | U   | CNN | CPN | U   | U |
| 4 | CNN | U   | U   | U   | U   | CNN | CPN | U   | U |
| 5 | KP  | U   | U   | U   | U   | KP  | KN  | K*  | U |
| 6 | KN  | U   | U   | U   | U   | KN  | KP  | K*  | U |
| 7 | K*  | U   | U   | U   | U   | K*  | K*  | K*  | U |
| 8 | U   | U   | U   | U   | U   | U   | U   | U   | U |

*FIG. 3*

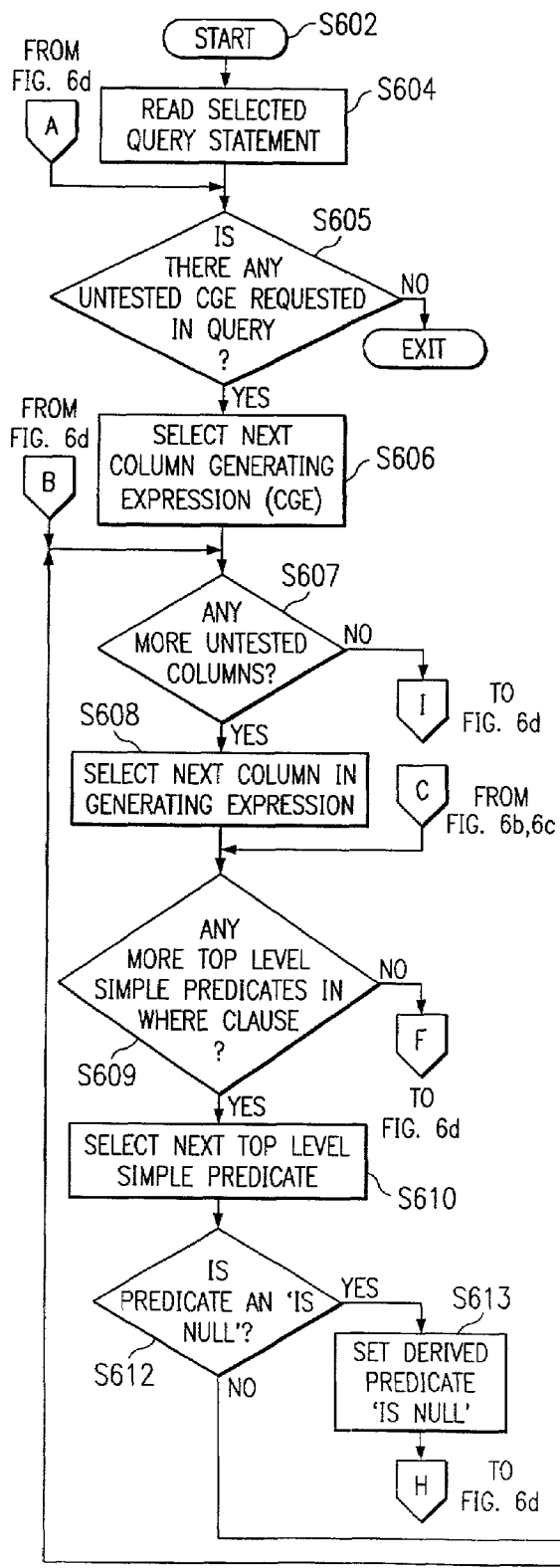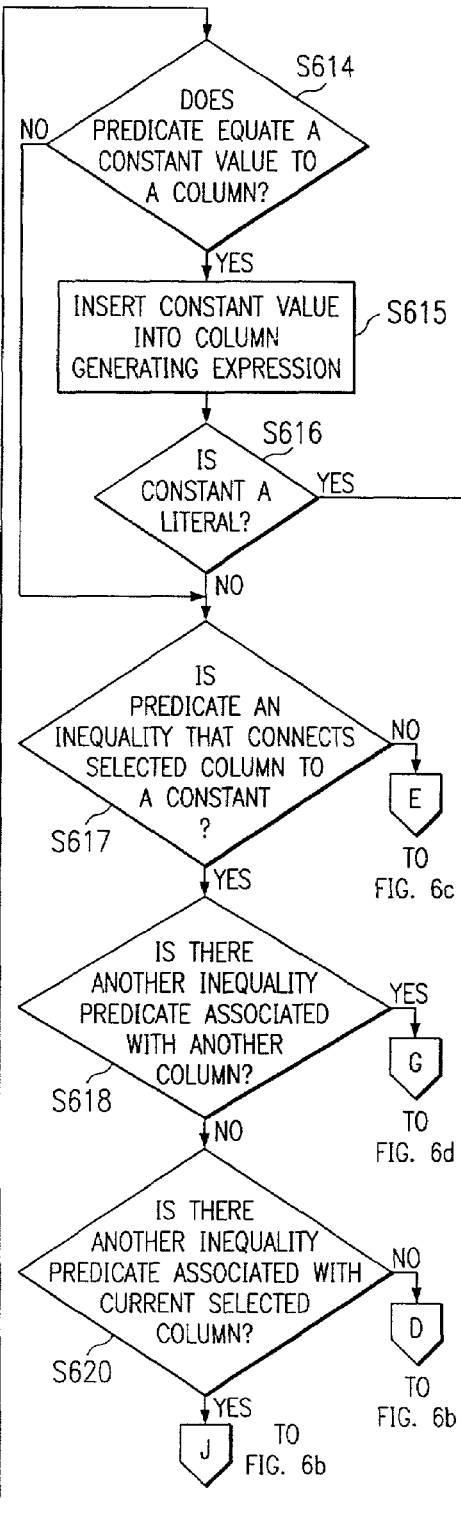
FIG. 6a

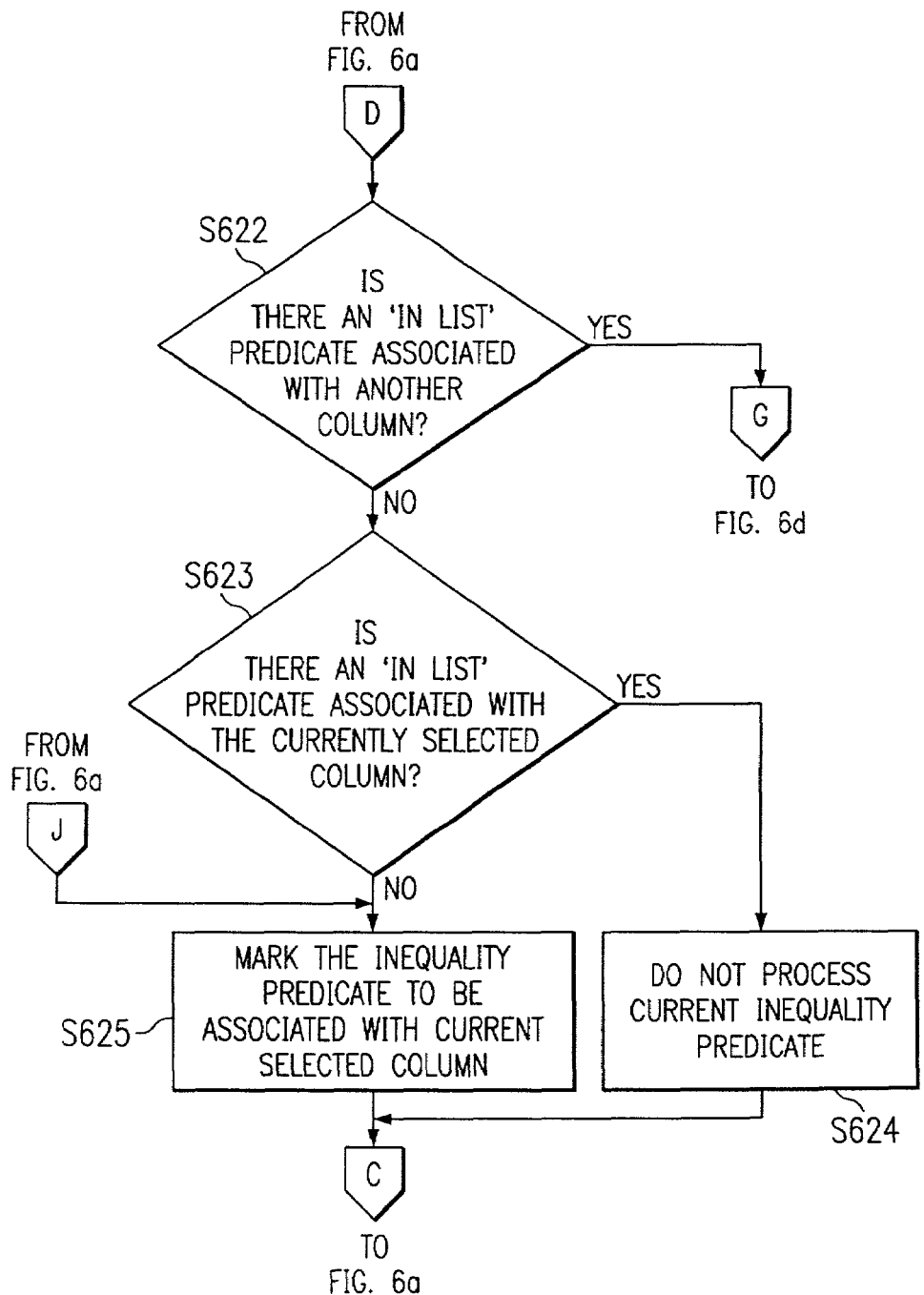

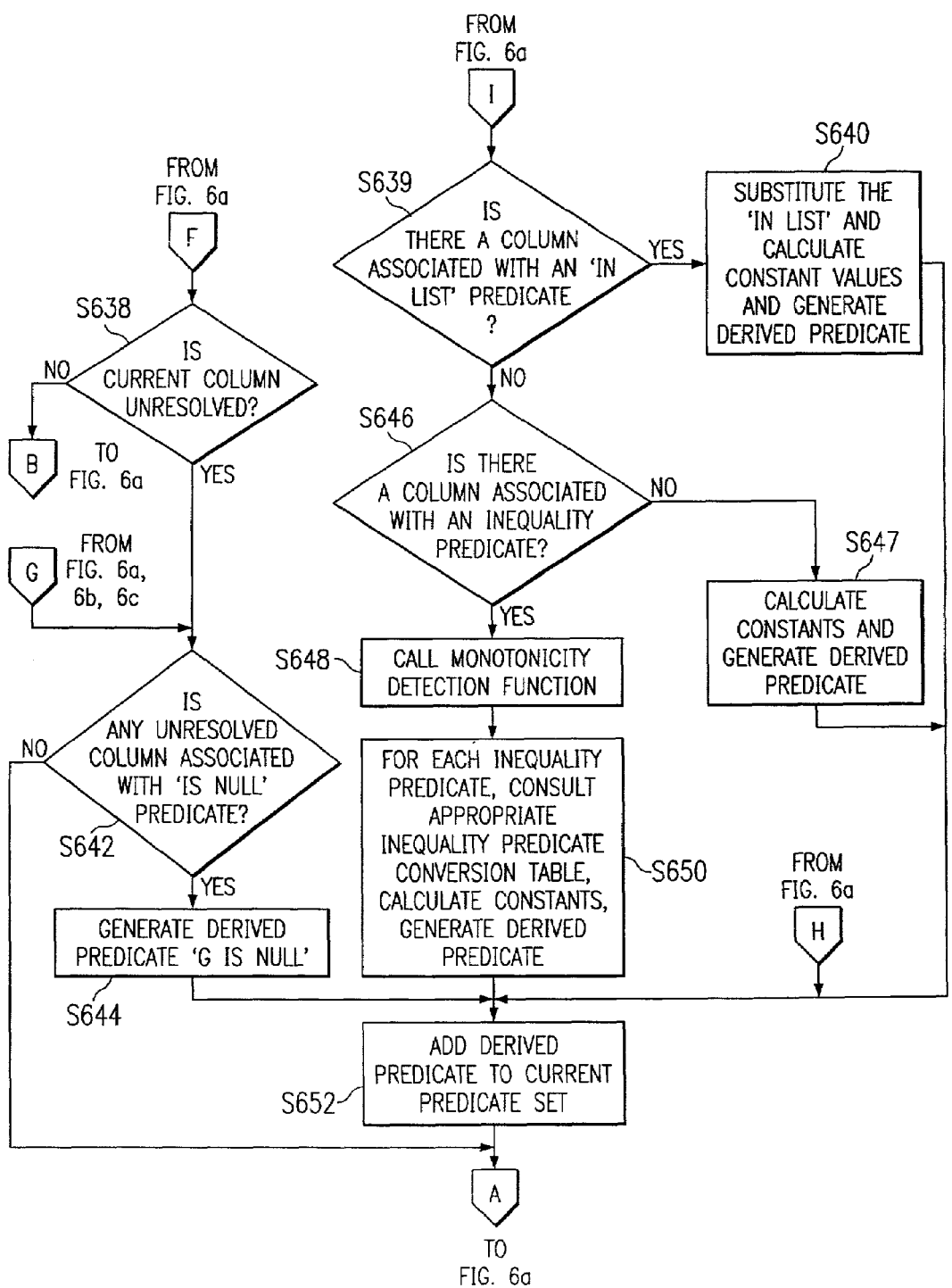

OPTIMIZING DATABASE QUERY BY GENERATING, DETERMINING THE TYPE OF DERIVED PREDICATE BASED ON MONOTONICITY OF THE COLUMN GENERATING EXPRESSION FOR EACH REMAINING INEQUALITY PREDICATE IN THE LIST OF UNEXAMINED PREDICATES

FIELD OF THE INVENTION

The present invention relates to database query predicates in database management systems. More specifically, the present invention relates to deriving query predicates.

BACKGROUND

In a relational database, data is stored in tables. The database is managed by a Database Management System (DBMS). Through database queries to the DBMS, the DBMS may retrieve desired data from the database. Database queries, as well as other database management commands, are typically formulated in the Structured Query Language (SQL). An SQL query may request data from the database that meets several search conditions (known as "predicates"). Such a query may consume considerable processing resources of the DBMS. Accordingly, the present invention seeks a solution to reduce the processing resources, at least for some SQL queries. It is known to generate one or more additional columns in a database table, the entries of which are a function of one or more of the pre-existing columns of the table.

SUMMARY OF THE INVENTION

In the present invention, where a database query has predicates involving certain columns of the database table, it is determined if these are the same columns as those used to generate a column of the database table. If yes, new predicates may be added to the query, which may be useful in processing the query more efficiently.

In practice, database queries often involve the same columns of the database table. In consequence, it frequently occurs that there is a generated column which may be used to establish a substitute query.

According to the present invention, when expressions involving columns are used in queries and data definition, if the expression is monotonic, extra predicates can be derived from the given predicates in a query, in order to process the query more efficiently. In accordance with an aspect of the invention, a method and computer program product are provided for detecting cases of monotonicity that are susceptible to determine which given predicates are appropriate to be used as a basis to derive the extra predicates. There are a number of ways to deduce known facts about data in a table, or data in the result of a query. Examples are constraints, which are predicates declared about the table, enforced by the DBMS; generated columns, which are columns whose values are calculated by the DBMS from values in other columns, and other predicates specified in a query. These known facts are used in combination with given predicates on columns referenced in the constraints, generating expressions of generated columns, to derive additional predicates, which do not change the result of the query, but may be used to process the query more efficiently. While the present invention is described with reference to generated columns, it will be seen by the person skilled in the art that it may also be used for other constraints.

In accordance with another aspect of the invention, a set of given predicates and column generating expressions in a database query statement are examined to determine those predicate forms that can provide new, derived predicates that the database system can process more efficiently than the original predicates. The given predicates are analysed to extract those predicates that can be used directly to derive more efficient predicates, then the remaining predicates not so extracted are analysed for monotonicity. The type of monotonicity that is a property of each generating expression is determined and the type of a resulting derived predicate is read from a conversion lookup table.

In accordance with a further aspect of the invention, a method is provided for use in a database table that contains at least one column that is generated using a generating expression and where the database is searched by queries including search statements having predicates, where if the generating expression is known to be monotonic, at least one additional predicate is derived from the given predicates involving columns used in the generating expression. The specific type of monotonicity, that is, increasing, decreasing, nonincreasing or nondecreasing, affects the types of additional predicate that can be derived. For equality predicates in a search statement, additional predicates can be derived whether or not the generating expression is monotonic. For inequality predicates, monotonicity is a requirement for deriving additional predicates that are reliable and specific. The monotonicity of the substituted generating expression is determined, and the relational operator ("RELOP") is determined for each derived inequality predicate from the relational operator for each original predicate using a lookup table. Under the conditions where a column appears in an inequality predicate with a constant value at the top level of a WHERE clause, and the deriving function is monotonic with respect to the referenced column, and all other columns referenced in the generating expression appear in the WHERE clause in equality predicates, at the top level with constant values, a lookup table is used to determine which inequality operator to use in each derived predicate. Each derived predicate is added to the original predicate in a Boolean AND operation. Thus a query will contain an additional element that may be evaluated by the DBMS more quickly and with fewer resources than the original query without the additional element. The improved efficiency is dependent on the precise nature of the database tables, the generated columns and the query itself.

A better understanding of these and other aspects of the invention can be obtained with reference to the following drawings and description of the preferred embodiments.

BRIEF DESCRIPTION OF THE DRAWINGS

The embodiments of the present invention will be explained by way of the following drawings:

FIG. 1 depicts a predicate derivation module and lookup tables for use in a data processing system;

FIG. 2 depicts an addition lookup table and a subtraction lookup table included in the lookup tables of FIG. 1;

FIG. 3 depicts a multiplication lookup table and a division lookup table included in the lookup tables of FIG. 1;

DETAILED DESCRIPTION

Figure 4:
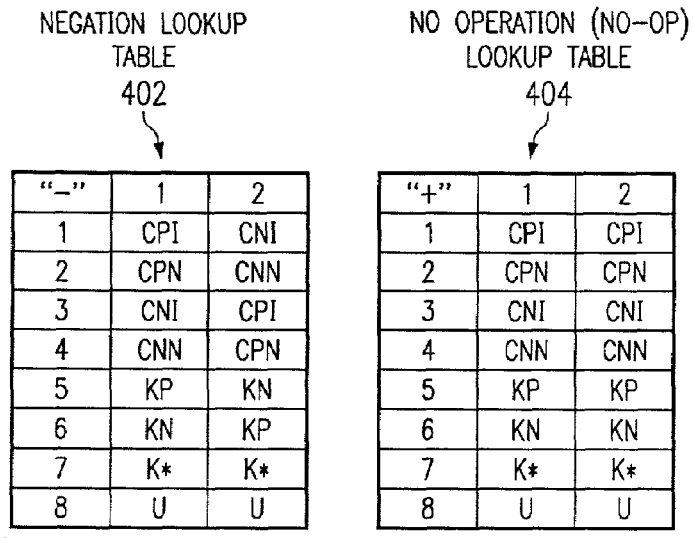
FIG. 4 depicts a negation lookup table and a no-operation (no-op) lookup table included in the lookup tables of FIG. 1.

In overview, an embodiment of the present invention provides a predicate derivation module which reads a database query statement having a given predicate (that is, a search condition), and based on the given predicate derives or generates a new predicate, and then writes a new database query statement having the new or derived predicate. The embodiment of the present invention can be included in a database management system (DBMS), or can operate independently of the DBMS. The DBMS manages data stored in databases such as tables, and processes database queries against the stored data. A database query statement (also called 'query') typically specifies search conditions (that is, predicates) for qualifying desired results to be output by the DBMS. The database query statement can be formed in a computer programming language such as, for example, SQL (Structured Query Language). SQL offers many types of search conditions. In the ANSI/ISO standard for SQL, 'search conditions' are called 'predicates'.

Typically the predicates are examined prior to determining monotonicity, and many predicates, including inequality predicates, can be used, because they are associated with non-inequality predicates, to derive new predicates that can work more quickly in executing a query. During this examination and derivation process, as the inequality predicates are used in deriving the new predicates, they leave for further analysis only the inequality predicates that are not so associated. If there are remaining inequality predicates, then the column generating expressions are examined for monotonicity. Then as described, the column generating expressions are tested in a conversion lookup table and the type of a resulting derived predicate is determined from the lookup table. Monotonicity needs to be determined only for inequality predicates in the present invention. The following provides a background description of predicates used in SQL query statements. SQL is a computer programming language that provides commands or statements for directing a DBMS (which is provided by a variety of manufacturers, such as DB2™ Universal Database™ supplied by IBM Corporation of Armonk, N.Y., USA) to create, access, or manage database objects such as tables (having rows of records), views of the tables, and indexes of the tables. SQL query statements can be executed directly against the DBMS or can be incorporated in a traditional application programming language. There are many features of SQL used for solving a variety of database query problems. For example, SQL includes many types of statements, such as Data Definition Language Statements (DDLs) for creating, dropping, or altering objects in a database, Data Manipulation Language Statements (DMLs) for retrieving and manipulating the data stored in tables, Predicates or Search Conditions Statements to search for data, Security and Authorization Statements surrounding security aspects of databases, Scalar Functions, Column Functions, Multiple Table Processing, Date and Time Processing, Application Programming, and many other types of SQL query statements.

A simple SQL query statement is characterized in the SELECT statement (or operation) for retrieving data stored in a table or tables. A collection of tables or a single table can be referred to as a database. The SELECT statement is used in conjunction with clauses (some required and some optional) to find and view information in many ways. An example of the SELECT statement is:
SELECT column_name
FROM table_name
WHERE search condition
GROUP BY column_name
HAVING search condition The WHERE clause is optional. The WHERE clause is used to filter (select) rows returned from the FROM clause. The WHERE keyword is followed by an expression (which is technically known as a 'predicate' or a 'search condition'). The predicate is used for evaluating the data stored in rows of a table. The result of this evaluation provides an indicator for indicating a status condition (such as, TRUE, FALSE, UNKNOWN) related to the evaluated rows of the table or tables. The 'TRUE' status condition implies rows were found that match a specified predicate. The 'FALSE' status condition implies that no rows match the specified predicate. The 'UNKNOWN' status condition implies that a DBMS attempted to evaluate the specified predicate, but could not determine any result. For example, the types of predicates provided by SQL include the BASIC predicate, QUANTIFIED predicate, BETWEEN predicate, IS NULL predicate, LIKE predicate, EXISTS predicate, and the IN predicate. A predicate includes an expression (typically, a mathematical expression). If the expression is evaluated by a data processing system, an evaluation value is computed. The evaluation value can be any valid SQL data type. There are many types of operands which can be included in the expression of the predicate, such as Function f(x) of a variable x, Constant, Column Name, Host Variable, Special Register, Labelled Duration. The predicate can contain many types of operands connected by operators. Operands are values. Operators can be arithmetic such as (+, −, *, /), or comparison such as (=, <, >, < >, $\leq$, $\geq$).

A basic predicate is used to compare two values (that is, operands). The result of the comparison of two operands can be TRUE, FALSE, or UNKNOWN. For example, to select all rows in the employee table where SALARY is greater than $20,000, the following SQL query statement having the basic predicate can be used:
SELECT EMP_NO, DEPT, SALARY
FROM EMP_TABLE
WHERE SALARY>20000

It will be appreciated that the predicate 'SALARY>20000' is an expression which includes operand 'SALARY' and operand '20000' which are connected by operator '>'.

A BETWEEN predicate is used to compare an expression (which can be a constant value, or a value yet to be determined) with a range of values beginning with a specified value and inclusive of an ending value. For example, to select all rows in the employee table where DEPARTMENT is between 10 and 30, the following SQL query statement having the BETWEEN predicate can be used:
SELECT EMP_NO, DEPT, SALARY
FROM EMPLOYEE_TABLE
WHERE DEPT BETWEEN 10 AND 30

It will be appreciated that the predicate 'DEPT BETWEEN 10 AND 30' includes two expressions which are '10' and '30' (which are constants). An operator is not included in the BETWEEN predicate. However, an 'AND' operation is included in the BETWEEN predicate.

An 'IS NULL' predicate is used to test for the existence of null values or for the non-existence of null values. A LIKE predicate can be referenced in the WHERE clause to search for character strings. An EXISTS predicate is used to determine if there is an existence of a certain row in a table.

An IN predicate is used to compare a value against multiple values. For example, to select all rows in the employee table where the department is either 10 or 50, the following IN predicate is used:

SELECT EMP_NUM, DEPT, PHONE_EXT, FNAME, LNAME
  FROM EMPLOYEE_TABLE
  WHERE DEPT IN (10, 50)

It will be appreciated that the predicate 'DEPT IN (10, 50)' includes two expressions which are '10' and '50' (which are constants). An operator is not included in the IN predicate.

A simple predicate is any single predicate of one of the types listed above. A complex predicate can specify several simple predicates, in which the simple predicates are separated by Boolean AND operators or OR operators. A complex predicate is also known as a predicate set. The terms are used equivalently in the present disclosure and claims. For example, to find all the rows of employee table where the DEPT equals '40' OR the SALARY is greater than '1000', the following SQL query statement having a complex predicate can be used:

SELECT EMP_NUM, DEPT, PHONE_EXT, FNAME, LNAME
  FROM EMPLOYEE_TABLE
  WHERE DEPT=40 OR SALARY>1000

It will be appreciated that the complex predicate 'DEPT=40 OR SALARY>1000' includes two simple predicates. The first simple predicate is 'DEPT=40' which includes two operands 'DEPT' and '40' connected together by operator '='. The second simple predicate is 'SALARY>1000' which includes two operands 'SALARY' and '1000' connected together by operator '>'. The first and the second simple predicates are connected together by the Boolean OR_operator.

Some DBMS provide functions for automatically computing a value for each row of a generated column in response to processing an SQL query statement having a 'column generating expression' which references at least one column of a table. The following is an example of an SQL query statement having a column generating expression for generating a value for each row of a column G:

CREATE TABLE T (A INT, B INT, G INT GENERATED ALWAYS AS (A+B))

The name of the TABLE is 'T'. The columns of TABLE T are 'A' and 'B'. The column to be generated is 'G'. Once column G is generated, generated column G is appended to TABLE T. The value of each row of column G is the sum of the corresponding rows of columns A and B of TABLE T. The column generating command is:

G INT GENERATED ALWAYS AS (A+B)

The column generating expression is:

A+B

The column generating expression specifies column A and column B both of TABLE T. Several known DBMS, such as DB2™ Universal Database™, provide functions for processing the example SQL query statement having a command to generate a value for each generated column G. Embodiments of the present invention read a given SQL query statement having a given column generating expression, and write a new SQL query statement having a new predicate for improved query operation.

Referring to FIG. 1, there is depicted a data processing system 100 including computer readable memory 112 operatively coupled to a central processing unit (CPU) 114. Stored in the memory 112 is a predicate derivation module 104 and lookup tables 108. The predicate derivation module 104 includes code or computer programmed instructions (generated from a computer programming language) for directing the data processing system to achieve desired operations (as will be described later). In another embodiment, the predicate derivation module does not reside in memory 112 but is a signal carrying circuit having input and output connections which are operatively coupled to the data processing system 100. In other embodiments, the predicate derivation module 104 includes a combination of computer programmed instructions stored in memory 112 operatively coupled to a signal carrying circuit.

It will be appreciated that computer programmed instructions can be converted into an equivalent signal carrying circuit and vice versa. Computer program product 116 includes a computer readable medium (stored in a medium) for transporting the predicate derivation module 104 comprised of computer programmed instructions to the memory 112 via interfacing circuits (not depicted). Alternatively, computer program product 116 can be transported to the memory 112 from a network such as the Internet via network interfacing circuits operatively connected to the data processing system 100. Optionally, the computer program product 116 provides computer readable program code and data for implementing the lookup tables 108 (it will be appreciated that the code for the module 104 and the data for the tables 108 can be supplied on separate media). Optionally, the computer program product 116 provides computer readable program code and data for implementing the database management system 110 which includes the predicate derivation module 104 and the lookup tables 108. The computer readable medium may include, for example, a disk, a tape, a removable memory chip, or a file downloaded from a remote source.

Predicate derivation module 104 reads a query 102 having a given predicate, processes the given predicate to generate a new query 106 having a new predicate. Lookup tables 108 include monotonicity lookup tables, as shown by examples in FIGS. 2, 3, and 4, and a relational operator lookup table as shown by an example in FIG. 5. Once the new query 106 is generated, it is used against a database management system 110 stored in memory 102. Optionally, the database management system 110 may reside remotely in another data processing system (not depicted), and the new query 106 may be transported to the other data processing system for application against the remotely located database management system (via a network). It will be appreciated that the predicate derivation module 104 may operate as an independent module separate from the database management system 110, or may operate as a module integrated with the database management system 110.

As will be understood by those skilled in the art, whenever a column is generated for a database table, the column generating expression is stored in a catalogue. The present invention makes use of the column generating expression to obtain derived predicates.

As an example of the use of monotonicity, consider a table T having a generated column G, whose column generating expression G(C) involves a column C of table T and some constants. Where the original predicate involves inequality operators and it is known that the expression G(C) is monotonic with respect to C, it is possible to derive additional predicates from given predicates that involve column C. This provides more flexibility in generating database query access plans which may perform more efficiently than if the additional predicates were not available. The specific type of monotonicity (that is, increasing, decreasing, non-increasing, or nondecreasing) determines the type of predicates which may be derived. Where the original predicate is an equality-type predicate, predicates can be derived even if the column generating expression G(C) is not monotonic. These cases are explained in detail below. There are two types of predicates that are processed by predicate derivation module 104: equality-type predicates (that is, predicates having the '=' operator), and inequality-type predicates (that is, predicates having certain other types of operators, namely, >, >=, <, and <=, and also the BETWEEN predicate).

When processing equality-type predicates, detection for the type of monotonicity is not required (that is, lookup tables 108 are not used). A requirement for processing an equality-type predicate is that all columns referenced in a column generating expression G(C) (where G(C) generates a derived column) must appear in equality-type predicates with constant values, at the top level (i.e., they include Boolean Factors (BF)), and they must not appear as descendants of OR or NOT operations in the given predicate. As is known to the person skilled in the art, a top level condition is an individual condition within a complex condition, that must be true for the entire complex condition to be true. A 'constant value' is any value that remains constant during the processing of the SQL query, for example any of the following: literal, parameter marker, host variable, or correlated reference (to a column in a higher level query). If this condition is satisfied, a derived predicate can be generated which has the following form:

COL=EXP

COL is the name of the derived column. EXP (that is, an expression) is a copy of a column generating expression G(C) with each column name replaced by the value it is equated to in the equality-type predicate that meets the above condition.

An IN predicate, also known as an IN LIST predicate, can be handled as a special case of an equality-type predicate if: (1) only one of the columns in a column generating expression is involved in the IN LIST predicate; (2) that column appears alone on the left-hand side of the IN predicate; (3) all the values in the IN list are constant values as defined above; and, (4) all the other columns (if any) in the generating expression are in equality-type predicates with constant values. For example, if a generating expression for column G is (A+B) and if the original predicate is A IN (10, 20, 30), the tests above are met. If a generating expression for column G is (A+B) and if the original predicate is A IN (B, 20, 30), test (1) is not met because both column A and column B are in the IN predicate. If column C is used in a generating expression and associated with an IN predicate that satisfies conditions 1 to 4 above, the derived predicate will be of the form:

COL IN (EXP1, EXP2, . . . ).

COL is the generated column. Each expression (that is, EXP1, EXP2, . . . ) is a copy of the generated predicate with column C replaced by each element of C's IN list predicate, respectively, and the other columns (if any) replaced by their equated constant values as before.

EXAMPLE 1

A given SQL query statement includes a given predicate (which can be found in a WHERE clause) for operation on a table, which is:

'A=10 AND B=20'

A column generating expression G(C) was previously applied to the table and the table includes a generated column G. The column generating expression G(C) (which involves two columns A and B of the table can be found in a catalogue) is:

A+B

In this case, predicate derivation module 104 does not need to determine the type of monotonicity for the generating expression because this is a case of equality-type predicates. The given predicate is a complex predicate including a first basic predicate (that is, A=10) and a second basic predicate (that is, B=20). The first basic predicate includes an operand 'A' (a variable) and an operand '10' (a constant) which are connected together by operator '=' (that is, the equality operator). The second basic predicate includes an operand 'B' (a variable) and an operand '20' (a constant) which are connected together by operator '=' (that is, the equality operator). Predicate derivation module 104 of FIG. 1 reads the given predicate and generates a derived predicate, which is:

G=10+20

The derived predicate is a basic predicate that equates the generated column G with a constant (that is, 10) of the first simple predicate and the constant (that is, 20) of the second simple predicate which are connected together by the operator '+' (that is, the operator found in the column generating expression). The derived predicate is ANDed with the existing or original WHERE clause, and the result provides a new WHERE clause, which is:

WHERE A=10 AND B=20 AND G=10+20

It will be appreciated that the new WHERE clause can be reduced to the following:

WHERE A=10 AND B=20 AND G=30

The original WHERE clause included in the given SQL query statement is replaced with the new WHERE clause.

EXAMPLE 2

A second example SQL query statement includes a given predicate (which can be found in a WHERE clause) for operation on a table, which is:

'B IS NULL'

A column generating expression G(C) was previously applied to the table and the table includes a generated column G. The column generating expression G(C) is:

A+B

Because B IS NULL, it does not matter what value A has. Therefore, G is, effectively, a function of both columns of the original query. Further, predicate derivation module 104 does not need to determine the type of monotonicity for the column generating expression. Predicate derivation module 104 of FIG. 1 reads the SQL query statement, performs operations for subsequently generating a derived predicate. Predicate derivation module generates the derived predicate, which is:

G IS NULL

The derived predicate is ANDed with the original WHERE clause, and the result provides a new WHERE clause which is:

WHERE B IS NULL AND G IS NULL

The original WHERE clause included in the SQL query statement is replaced with the new WHERE clause.

As an example, where a generating expression is 'A+B', a given inequality predicate includes:

VARIABLE_1 RELATIONAL_OPERATOR VARIABLE_2

(such as 'A<30'), in which VARIABLE_1 is 'A', VARIABLE_2 is the constant '30', and '<' is the inequality operator, and where B=10. A type of monotonicity is determined for the generating expression 'A+B', which is resolved to 'A+10'. For example, the type of monotonicity for A is determined to be 'CPI', and the type of monotonicity for 10 is determined to be 'KP'). Since addition is involved, lookup table 202 of FIG. 2 is used. Since the A is 'CPI', the system finds the row containing 'CPI' which occurs in row 1. Similarly, since 10 is 'KP', the columns of Table 202 are examined for 'KP' which occurs in column 5. The intersection of row 1 and column 5 indicates that the monotonicity of the generating expressionis 'CPI'. Now the system examines the table in FIG. 5, and selects 'CPI' in row 1, and '<' which is in column 3, giving the result '<'. Now we substitute the constant '30' into A, and since the derived expression is 'G<A+10', the substitution yields 'G<40'.

When processing inequality-type predicates, it is required to determine the type of monotonicity for each generated column. The type of monotonicity can be determined in any convenient manner. Preferably the determination is done by the use of a lookup table, as is described in greater detail below. The conditions on columns referenced in the column generating expression are as follows: (1) one of the columns, for example C, appears in an inequality-type predicate with a constant value (or two constant values, in the case of a BETWEEN predicate) at the top level of a given predicate; (2) the column generating expression must be monotonic with respect to column C; (3) and, all other columns referenced in the column generating expression appear in an equality-type predicate, at the top level, with constant values.

Constant values are defined in the same way as that for equality-type predicates. If there is more than one inequality-type predicate on the same column C, each of them can separately be used to generate a derived predicate. Inequality-type predicates considered, for this purpose, are basic predicates that use the relational operator >, ≧, <, or ≦. It will be appreciated that a BETWEEN predicate inherently includes inequality operators. When the conditions are met, predicate derivation module 104 of FIG. 1 can generate a derived predicate for a given inequality-type predicate which is of the following form:

COL RELATIONAL_OPERATOR EXP

Alternatively, the following form is generated for a given BETWEEN predicate:

COL BETWEEN EXP1 AND EXP2

COL is the name of a derived column. Expressions EXP, EXP1, and EXP2 are copies of column generating expression, with column C1 substituted with the value C1 is compared with in the inequality-type predicate. RELATIONAL_OPERATOR (that is, RELOP) such as (<, >, ≦, ≧) is an inequality-type operator, and the choice of which depends on column C1's given inequality-type predicate and the type of monotonicity that is determined with respect to column C1.

Figure 5:
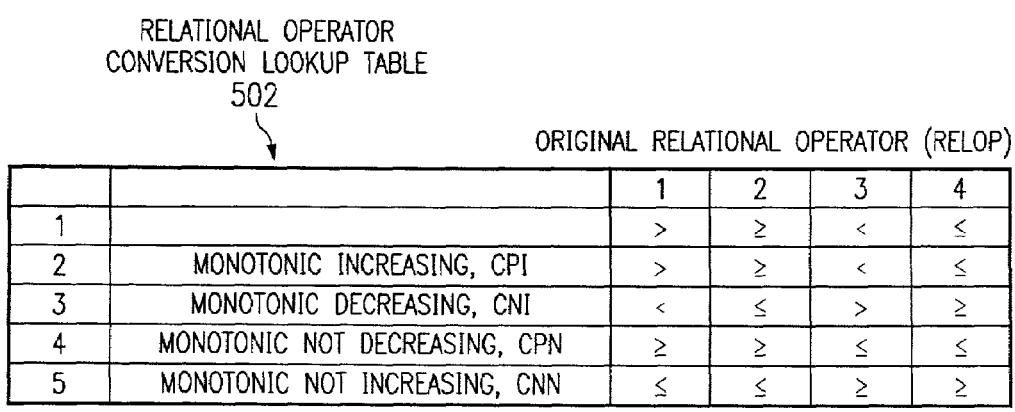
FIG. 5 depicts a relational operator conversion lookup table included in the lookup tables of FIG. 1.

Referring now to table 502 of FIG. 5, CPN is found in row 3, and the original relational operator, '<', is found in column 3. The intersection of column 3 and row 3 indicates the relational operator to be used in the generated inequality predicate is '≦' relational operator (that is, the '<' operator is exchanged for the '≦' operator).

FIG. 5 shows a conversion lookup table 502 for converting original RELOP depending on the type of monotonicity detected. Conversion lookup table 502 assumes the original inequality-type predicate is of the form:

C1 RELOP CONSTANT

If the form is CONSTANT RELOP C1, the result RELOP is inverted (for example, use '<' instead of using '>'). Alternatively, a derived predicate is generated with the expression on the left and the derived column on the right.

For a BETWEEN predicate, the order of EXP1 and EXP2 is the same as in an original predicate on column C1, unless the derived column is monotonic decreasing (that is, 'CNI') or monotonic not increasing (that is, 'CNN'), in which case the order is reversed.

Embodiments of the present invention include an operation for evaluating whether an expression is monotonic and the type of monotonicity the function f(x) portrays. If a function f(x) is determined to be monotonic, embodiments of the present invention provide an operation for deriving additional predicates from a given predicates specified in an SQL query statement. These additional predicates can improve the processing of the SQL query in a more efficient manner. Embodiments of the present invention provide an operation for detecting types of monotonicity and using the detected monotonicity to derive a new predicate from a given predicate.

Monotonicity is a property of a mathematical function f(x). The mathematical function f(x) can represent a predicate. A type of monotonicity indicates whether values of the mathematical function f(x) never increase (or never decrease) as x increases. Function f(x) is monotonic increasing if for all numerical values of x1 and x2 in which x1<x2, f(x1)<f(x2). An example of a monotonic increasing function is f(x)=x+100. Function f(x) is monotonic decreasing if for all numerical values of x1 and x2 in which x1<x2, f(x1)>f(x2). An example of a monotonic decreasing function is f(x)=−x. Function f(x) is monotonic nonincreasing if for all numerical values of x1 and x2 in which x1<x2, f(x1)≧f(x2). An example of a monotonic nonincreasing function is f(x)=−x/20. A function f(x) is monotonic nondecreasing if for all numerical values of x1 and x2 in which x1<x2, f(x1)≦f(x2). An example of a monotonic nondecreasing function if f(x)=x/10. A function f(x) is injective if any change in an input value x results in a change in the output value f(x). Thus, an injective monotonic function f(x) is either monotonic increasing or monotonic decreasing.

A scalar function can be monotonic, just as arithmetic operations can. Examples of scalar functions that are monotonic are conversion (or "casting") functions, such as float(x) or integer(x); and substring(x,y,z), when the starting position specified (y) is the constant "1". Examples of scalar functions that are not monotonic are sin(x), length(x), and substring(x,y,z) when the starting position specified (y) is not the constant "1". When a scalar function is used in an expression whose monotonicity is to be determined, it is handled on a case by case basis. The resulting monotonicity attributes are then applied to the rest of the expression's analysis in the same way as any other component of the expression. For example, consider the expressions integer(X)/100

The variable X is monotonic increasing injective, by definition. The function "integer(X)" preserves the monotonicity, except that the injective attribute is lost, if X is not an integer variable. This is because more than one different value of X could convert to the same integer value, and thus the result of the function is not always increasing. E.g., integer(3.4) and integer(3.1) both result in the value 3.

If the input of a function that preserves monotonicity is not monotonic, then the result of the function, generally, is also not monotonic. For example, integer(tan(X))

is not monotonic with respect to X because tan(X) is not monotonic.

To determine a type of monotonicity for an inequality-type predicate which is represented by a function f(x) or expression, in a preferred embodiment the column generating expression is parsed to identify the separate functions contained in the column generating expression. However, when an arithmetic operand is processed, such as multiplication, an appropriate lookup table is preferably used, as will be described in greater detail below.

FIG. 2 shows an addition lookup table 202 and a subtraction lookup table 204. FIG. 3 shows a multiplication lookup table 302 and a division lookup table 304. FIG. 4 shows a negation (unary minus) lookup table 402 and a no-op (no operation or unary plus) lookup table 404. For lookup tables 202, 204, 302, 304, 402, 404, attributes of the left and right operands are used as indexes into their respective lookup table, instead of actual values of the variables and constants. In using tables 202, 204, 302 and 304, the row is selected first based on the attribute of the left operand, and the column is then selected based on the attribute of the right operand. For Tables 202 and 302 it is not relevant whether the row or the column is selected first because Tables 202 and 302 are symmetrical. However, the sequence of selection is of course important for Tables 204 and 304. As an example, a given generating expression is:

A*100

Column "A" is considered, by definition, monotonic increasing. Since multiplication is involved, lookup table 302 of FIG. 3 is used. Since "A" is 'CPI', the system finds the row labeled 'CPI'. Similarly, since "100" is 'KP', the columns of Table 302 are examined for 'KP'. The intersection of row 'CPI' and column 'KP' indicates that the monotonicity of the inequality predicate is 'CPI'.

The rows, columns and results expressed in lookup tables 202, 204, 302, 304, 402, 404 are represented as follows. The symbol 'CXY' represents either the column C or a monotonic expression (of any type) in that column. Variable 'X' is either 'P' for monotonicity in the 'positive' direction (or positive slope) or is 'N' for monotonicity in the 'negative' direction (or negative slope). Variable 'Y' is either 'I' for injective monotonicity, or 'N' for non-injective monotonicity. The symbol 'KP' represents a constant or constant expression of any data type, including non-numeric, that is known to be positive or zero. All constants and constant expressions that are of a non-numeric data type are considered 'KP'. The symbol 'KN' represents a constant or constant expression that is known to be negative, applying only to numeric types. The symbol 'K*' represents a value that is a constant with respect to an SQL query statement (e.g., a host variable), but its sign is either unknowable (and left as K* for further use in the tables) or can be calculated at compile time, as when an arithmetic operator has constant operands (and is replaced with 'KP' or 'KN', depending on the result's sign). The symbol 'U' represents an expression that can't be detected as monotonic or is definitely not monotonic. In the case of a 'K*' result, the constant expression is evaluated (at least to the point of determining the sign of the result) at compile time, when possible, and the result either becomes 'KP' or 'KN' before use in the following steps.

A simple column reference as an operand is represented by 'CPI' in the tables, since it is the identity mapping, in effect, which is monotonic increasing. The lookup tables are conservatively derived. That is, correctness takes priority over performance. For example, adding a 'CPI' expression (or the original column) and a 'CPN' expression could be considered injective, but the lookup table assigns noninjective, due to the possibility of unexpected effects of imprecise representations of numbers in, say, a float type. Also, adding a 'CP' and a 'CN' yields 'U' (unknown monotonicity), though there are many cases that are in fact monotonic.

Referring to lookup addition table 202 of FIG. 2, the result of, for example, 'CPI' added to 'CNI' is 'U' (unknown monotonicity) because it cannot easily (if at all) be determined whether an increasing function added to a decreasing function will be always increasing, or always decreasing, or sometimes (i.e., for certain ranges of input values) be increasing and or decreasing.

EXAMPLE 3

A given SQL query statement specifies a column generating expression for generating a generated column G2. The column generating expression is:

SUBSTR(NAME, 1,3)

The column generating expression is determined to be monotonic not decreasing (that is, 'CPN'). SUBSTR is, by its nature, monotonic nonincreasing, if the starting point (the second operand) is the constant "1". In this example, the first three characters in a list of strings is in the same order as the original strings. The SQL query statement also includes a WHERE clause including a given predicate, which is:

WHERE NAME BETWEEN 'BAKER' and 'JONES'

Predicate derivation module 104 of FIG. 1 reads the SQL query statement, performs operations for subsequently generating a derived predicate. The generated derived predicate is:

G2 BETWEEN SUBSTR('BAKER',1,3) AND SUBSTR ('JONES',1,3)

The derived predicate term is ANDed to the original WHERE clause, which results in a new WHERE clause which is:

WHERE NAME BETWEEN 'BAKER' AND 'JONES' AND G2 BETWEEN SUBSTR('BAKER',1,3) AND SUBSTR('JONES',1,3)

The original WHERE clause included in the SQL query statement is replaced with the new WHERE clause. In this example, where the use of a lookup table can lead to indeterminate results, the monotonicity of the scalar expression is determined using a case-by-case analysis.

EXAMPLE 4

A given SQL query statement specifies a column generating expression for generating a generated column G3. The column generating expression is:
  −SALARY/1000

The column generating expression is determined to be a monotonic not increasing expression (that is, 'CNN'). The SQL query statement also includes a WHERE clause including a given predicate, which is:
  WHERE SALARY>200000

Predicate derivation module 104 of FIG. 1 reads the SQL query statement, performs operations for subsequently generating a derived predicate. The generated derived predicate is:
  G3≦−200000/1000

The generated derived predicate term is ANDed with the WHERE clause to provide a new WHERE clause which is:
  WHERE SALARY>200000 AND G3≦−200000/1000

As will be apparent to the person skilled in the art, the derived predicate may be more quickly processable by a computer system, for example if the new column G3 is indexed.

Since this is a case of reverse-order monotonicity, the original relational operator (RELOP) '>' located in the original WHERE clause was inverted to '≦' (by using conversion lookup table 502 of FIG. 5). Also, since the column generating expression is noninjective monotonic, the 'strict greater than' operator was converted (before inverting) to the 'greater than or equal to' operator. It will be appreciated that the derived predicate can be further reduced to the following:
  WHERE SALARY>200000 AND G3≦−200

EXAMPLE 5

A given SQL query statement specifies a column generating expression for generating a generated column G. The column generating expression is:
  A+B Predicate derivation module 104 does not need to determine the type of monotonicity for the column generating expression. The SQL query statement also includes a WHERE clause including a given predicate, which is:
  WHERE A IN (1, 2, 3) AND B IN (4, 5, 6) AND B=CORRELATED.C and CORRELATED.C=5

Predicate derivation module 104 of FIG. 1 reads the SQL query statement and performs operations for subsequently generating a derived predicate. The generated derived predicate is:
  G IN (1+5, 2+5, 3+5)

The new predicate term is ANDed with the WHERE clause to generate a new WHERE clause which is:
  WHERE A IN (1, 2, 3) AND B IN (4, 5, 6) AND B=CORRELATED.C and CORRELATED.C=5 AND G IN (1+5, 2+5, 3+5)

It will be appreciated that the new WHERE clause can be reduced to the following:
  WHERE A IN (1, 2, 3) AND B IN (4, 5, 6) AND B=CORRELATED.C and CORRELATED.C=5 AND G IN (6, 7, 8)

When additional predicates such as these are added to the query's conditions, they can be used if beneficial, such as when there is an index or any other method, the specifics of which are immaterial to this invention. If they are not beneficial, they can be removed and ignored, since they do not change the result of the query.

Operation of a predicate derivation module 104 of FIG. 1 will be further described below.

Figure 6C:
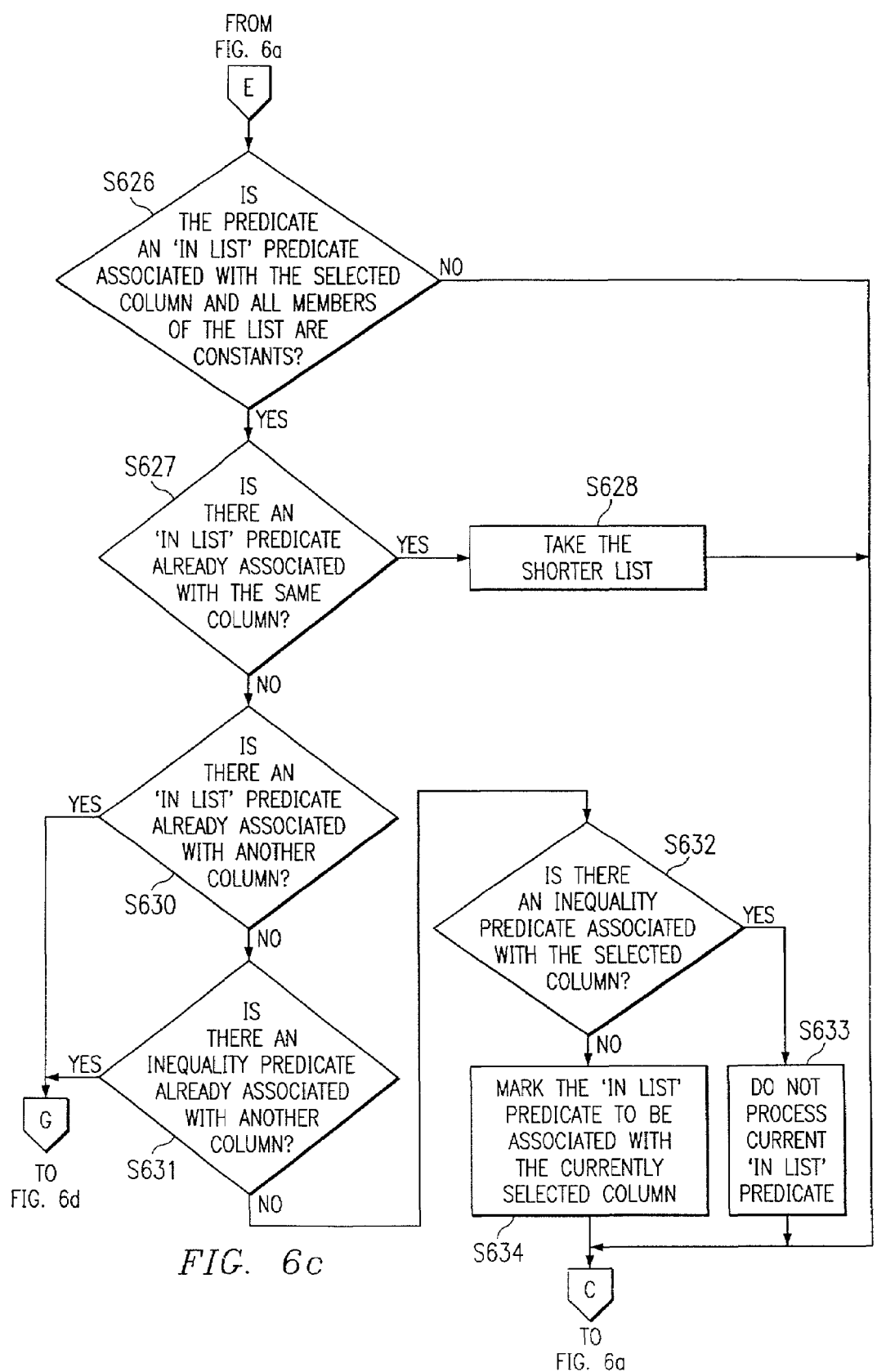
FIG. 6 is a flow chart showing examining predicates in a query statement and deriving additional predicates for those predicates that will improve the efficiency of handling the query.

The invention will now be discussed with respect to FIGS. 6a, 6b, 6c, which represent a flowchart depicting the predicate generation system and method in more detail.

Step S602 represents the beginning step of predicate derivation module 104 of FIG. 1. In step 604, module 104 reads a database query statement which queries a table or set of tables in which at least one table having a column generating expression. The database query statement can be, for example, a SQL statement. The SQL statement includes a given predicate that involves at least one column of a table. Typically, the given predicate is included in a WHERE clause of the SQL statement. The WHERE clause can include a combination of several simple predicates. For example, the given predicate located in the WHERE clause may be 'A=10 AND B=15'. The given predicate is a combination of two simple predicates 'A=10', 'B=15'.

Step S605 is reached either from step S604 or from input A, which is the return from a processing loop which will be discussed below. In step S605, module 104 determines whether there is an untested column generating expression in the tables that are requested in the query. If No, then the selected query statement has been fully resolved and module 104 exits to other functions in the DBMS. If Yes, then module 104 proceeds to select the next column generating expression in step S606.

In step S 606, module 104 selects the next column generating expression in the query statement, and proceeds to step S607, where it determines whether there are any more untested columns in the selected column generating expression. If Yes, the process continues to step 608. If No, processing proceeds to step S639, I in FIG. 6d.

In step S608, module 104 selects the next column in the column generating expression to be tested and continues to step S609, where it tests whether there are any more top-level simple predicates in the current column of the column generating expression. If Yes, the process continues to step S610. If No, processing proceeds to step S641, F in FIG. 6d.

In step S610, module 104 selects the next top-level simple predicate, and processing continues to step S612.

In step S612, module 104 determines whether the next simple predicate identified in the column generating expression is an IS NULL predicate associated with the selected column either directly or indirectly. If module 104 determines that there is an IS NULL predicate associated with the selected column, it sets the derived predicate to an IS NULL predicate (step S613), and proceeds to step S652 (H in FIG. 6c). If No, that is, if module 104 determines that there is no IS NULL predicate associated with the selected column, processing continues to step S614.

In step S614, module 104 determines whether a simple predicate is equated with a constant value to the selected column either directly or indirectly. For example, the selected column is 'A' and the simple predicate is 'A=10' (the constant value of 10 is equated to the selected column 'A'). If module 104 determines that the simple predicate is equated with a constant value, then at step S615 the constant value is inserted into the current column generating expression. Step S616 determines whether the constant is a literal, and if Yes, then processing breaks out of the first loop operation and returns to step S608 as the operation processes the next column of the column generating expression. If the decision in step S614 is No, processing moves to step S617.

In step S617, module 104 determines whether the predicate being examined is an inequality predicate that connects the selected column to a constant. If No, processing continues at step S626 (E in FIG. 6b) described below. If the decision at step S617 is Yes, processing under module 104 continues to step S 618.

In step S618, module 104 determines whether there is another inequality predicate associated with another column. For example, the given predicate is 'A>10 AND B>15'. If module 104 determines that there is another inequality predicate associated with another selected column, processing continues to step S638 (G in FIG. 6d). If the predicate derivation module 104 determines that there is no other inequality predicate connected with another selectable column, processing continues to step S620.

In step S620, module 104 determines whether there is another inequality predicate associated with the currently selected column. For example, if the given predicate is "A<3 AND A>0 AND B=3", two derived predicates will be generated (G<(3+3) becomes G<6 and G>(0+3) becomes G>3). If the determination is Yes, processing proceeds to step S625 (J in FIG. 6b). If the determination is No in step S620, module 104 proceeds to the next processing step at S622 (D in FIG. 6b).

At step S622, module 104 determines whether an IN LIST predicate is associated with another column. If Yes, processing continues to step S623 described below. If No, no derived predicate is generated and processing continues to step S638 (G in FIG. 6d).

In step S623, module 104 determines whether an IN LIST predicate is associated with a currently selected column. If an IN LIST predicate is associated with the currently selected column, processing will, at step S624, ignore the current inequality predicate and return processing to step S610 (C in FIG. 6A). If not, processing continues to step S625.

At step S625, the inequality predicate is marked to be associated with the selected column and at step S626, module 104 determines whether there is an IN LIST predicate associated with a currently selected column and whether all members of the IN LIST are constants. If module 104 determines that there is no IN LIST predicate associated with the currently selected column, processing returns to step S610 (C in FIG. 6a). Otherwise, processing continues to step S627 described below.

In step S627, module 104 determines whether there is an IN LIST predicate already associated with the selected column. If so, at step S628, processing selects the shorter IN LIST predicate, and returns to step S610 (C in FIG. 6a). For example from the predicates A IN (1, 2, 3, 4, 5) AND A IN (1, 3, 5) the selection will be A IN (1, 3, 5). If there is no IN LIST predicate already associated with the selected column, processing advances to step S630.

In step S630, module 104 determines whether a given predicate includes an IN LIST predicate associated with another column. If module 104 determines that the given predicate does include an IN LIST predicate associated with another column, processing continues at step S642 (G in FIG. 6d). If module 104 determines that the given predicate does not include an IN LIST predicate associated with another column, processing continues to step S631. For example, if the selected columns are 'A' and 'B', and if the given predicate is 'A IN (1,2) AND B IN (1,2), the derived predicate is not generated. Generally, to generate a derived predicate, an IN LIST predicate is associated with only one column.

In step S631, module 104 tests whether there is an inequality predicate associated with the current column. If Yes, processing continues at step S642 (G in FIG. 6d). If No, processing continues at step S632.

In step S632, module 104 determines whether there is an inequality predicate already associated with the selected column. If so, the current 'IN LIST' predicate is ignored (step S633), and processing returns to step S609 (C in FIG. 6a). If not, processing advances to step S634. For example, if the selected columns are 'A' and 'B', and if the predicate set is 'A>0 AND A IN (1, 2) AND B=3', then the second simple predicate 'A IN (1, 2) is ignored and the second loop operation returns to step S609 to process remaining untested simple predicates found in the given predicate. However, if the selected columns are 'A' and 'B' and the predicate is 'B>0 AND A IN (1, 2) AND B=3', then there is no part of the predicate associated with another column and processing advances to step S635.

In step S634, module 104 marks the 'IN LIST' predicate to be associated with the currently selected column, and returns processing to step S609 (C in FIG. 6a).

In step S638, module 104 determines whether the current column is unresolved, that is, neither resolved to a constant nor associated with an IN LIST predicate nor associated with an inequality operator. If No, then processing is returned to step S607 (B in FIG. 6a) for checking whether there are any more unresolved columns. If Yes, processing continues at step S642.

At step S642, module 104 tests. If a column does remain unresolved as determined in step S638, then for each unresolved column of the generating expression, module 104 determines in step S642 whether any unresolved column is associated with an IS NULL predicate. If No, then processing is returned to step S606 (A in FIG. 6a) to select the next column generating expression. If Yes, then at step S644 the system sets the derived predicate to "G IS NULL" and proceeds to step S652. In step S639, module 104 tests whether there is a column associated with an 'IN LIST' predicate. If Yes, then in step S640 the system substitutes the IN LIST and calculates the constant values, and processing continues to step S640. If No in step S639, processing continues to step S646.

Module 104 determines whether there is a selectable column which is associated with the IN LIST. If the predicate derivation module 104 determines that there is a selectable column which is associated with the IN LIST, then the IN LIST derived predicate is generated. If the predicate derivation module 104 determines that there is no selectable column associated with the IN LIST predicate, the operation continues to <operation 1200>. For example, the column generating expression is 'A+B', the given predicate is 'A IN (1, 2) AND B=10', the derived predicate is 'G IN (1+10, 2+10)', which resolves to 'G IN (11, 12)'.

In step S646, module 104 determines whether there is a column that is associated with an inequality predicate. If not, processing continues to step S652. If so, then the monotonicity detection function is called at step S648. Then at step S650, the monotonicity function, for each inequality predicate, performs the following operations:

consults the relevant monotonicity lookup table (see FIGS. 2, 3, or 4);

consults an inequality predicate lookup table (see FIG. 5);

calculates needed constants;

generates a derived predicate as described in Example 4; and returns processing to step S606 (A in FIG. 6A).

In step S652, the system combines the thus derived predicate with the current predicate set to generate a new predicate set. For example, the derived predicate is 'G=30', the given predicate is 'A=10 AND B=20'. The new predicate is 'A=10 AND B=20 AND G=30'. The new WHERE clause is thus 'WHERE A=10 AND B=20 AND G=30'. In the SQL statement, the given WHERE clause is substituted with the new WHERE clause.

In step S 654, module 104 determines whether there are any more column generating expressions in the current query statement, and if so, processing is returned to step 606 to select a new column generating expression. If not, the operation ends.

In steps where an Exit is shown, module 104 does not generate a derived predicate. Predicate derivation module 104 preferably generates result indicators for indicating that for the given SQL statement, a derived predicate was not generated. Result codes can be used to indicate the reason for not generating a derived predicate. Once result conditions are generated, processing of the predicate derivation module 104 ends.

Figure 7A:
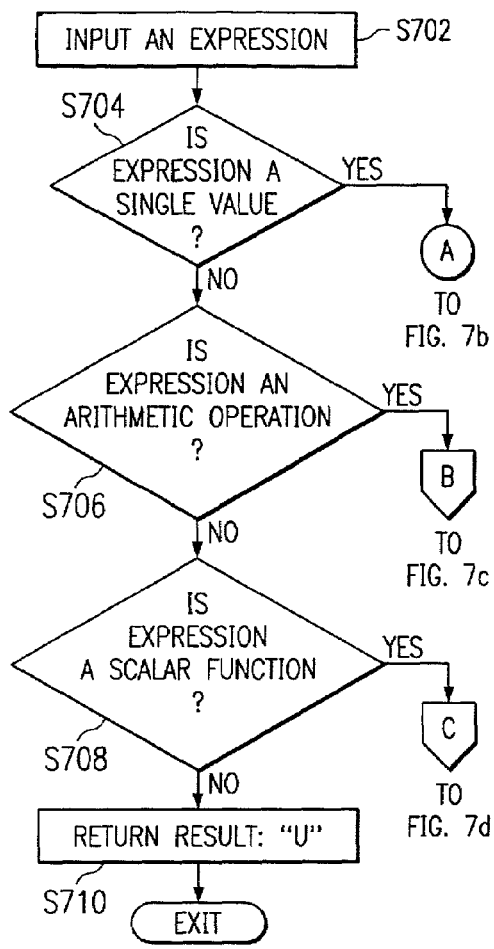
FIG. 7 is a flow chart showing determining monotonicity of expressions in the query statement.

FIGS. 7a to 7e represent a flowchart for monotonicity detection. In FIG. 7a, the first step S702 is to input an expression. At decision step S704, the system determines whether the expression is a single value. If Yes, processing continues at A in FIG. 7b. If No, the system tests at step S706 whether the expression is an arithmetic operation. If Yes, processing continues at B in FIG. 7c. If No, the system tests at step S708 whether the expression is a scalar function. If Yes, processing continues at C in FIG. 7d. If No, the system reports the result "U" at step S710, that is, the expression is an unknown expression type, and exits.

Figure 7B:
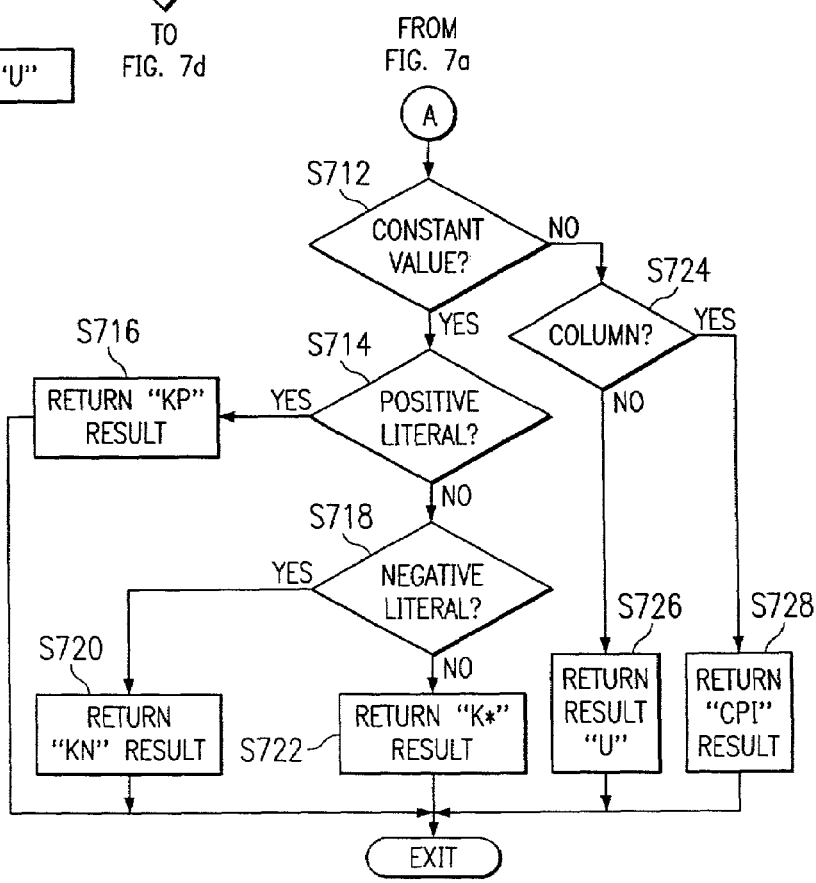

Turning to FIG. 7b, the system tests at step S712 whether the expression is a constant value. If Yes, then at step S714, it tests whether the expression is a positive literal. If Yes, the system returns the result 'KP' at step S716, and exits. If No, then it tests at step S718 whether the expression is a negative literal. If Yes, it returns at step S720 the result 'KN', and exits. If No, it returns at step S722 the result 'K*' and exits. If at step S712 the decision is No, the systems tests whether the expression is a column. If No, the system at step S726 returns the result "U", and exits. If Yes, the system returns at step S728, the result 'CPI', and exits.

Figure 7C:
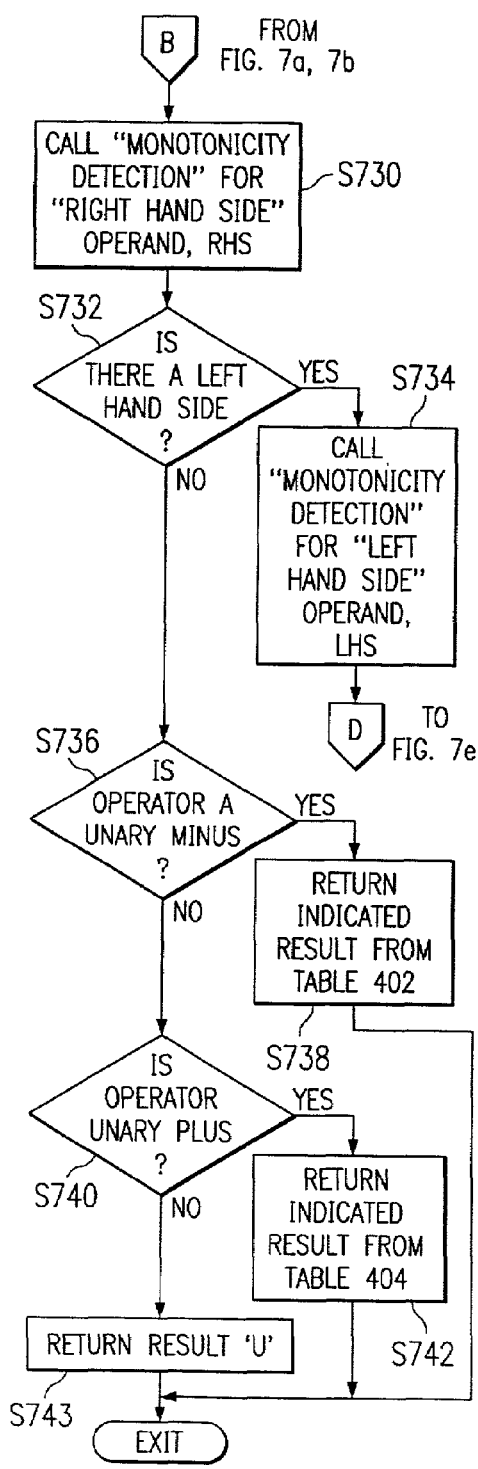

Turning to FIG. 7c, the system is now processing an arithmetic operation. At step S730 the system calls the monotonicity detection recursively for the "Right Hand Side" operand, termed RHS. At step S732, the systems tests whether there is a Left Hand Side. If Yes, the system at step S734 calls monotonicity detection for "Left Hand Side" operand, called LHS, and processing continues to D in FIG. 7e. If No, the system tests at step S736 whether the operator is a unary minus. If Yes, then at step S738 it returns the indicated monotonicity result using the Negation Lookup Table 402, and exits. If No, the system tests at step S740 whether the operator is a unary plus. If Yes, then at step S742 it returns the indicated monotonicity result using the No Operation Lookup Table 404, and exits. If No, it returns at step S743 the unknown result "U", and exits.

Figure 7D:
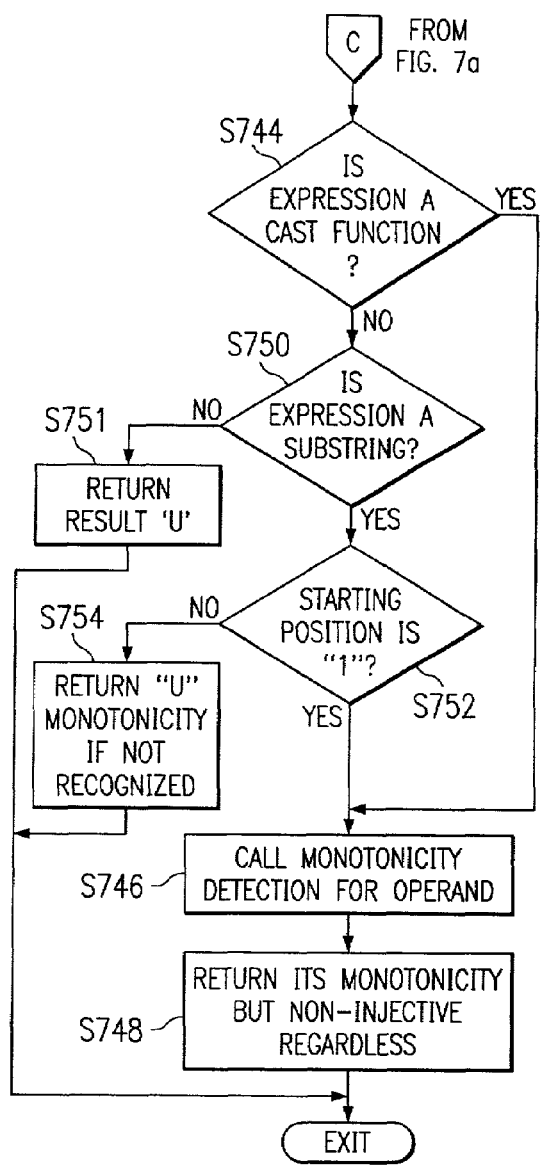

In FIG. 7d, the system is now processing a scalar function. At step S744, it tests whether the expression is a cast function. If Yes, the system calls the monotonicity detection for the operand, step S746, and returns the monotonicity at step S748. In this case, the function is non-injective regardless of its monotonicity. Similar tests can be done for other types of functions, not shown. If No at step S744, the system tests at step S750 whether the expression is a substring. If Yes, it tests at step S752 whether the starting position is "1". If Yes, processing continues to step S746. If No, the monotonicity of the expression is not recognized, then at step S754 the system returns "U", and exits. If the starting position is not "1" at step S750, the system tests for other starting positions, and further processing for those starting positions is similar to starting position "1".

Figure 7E:
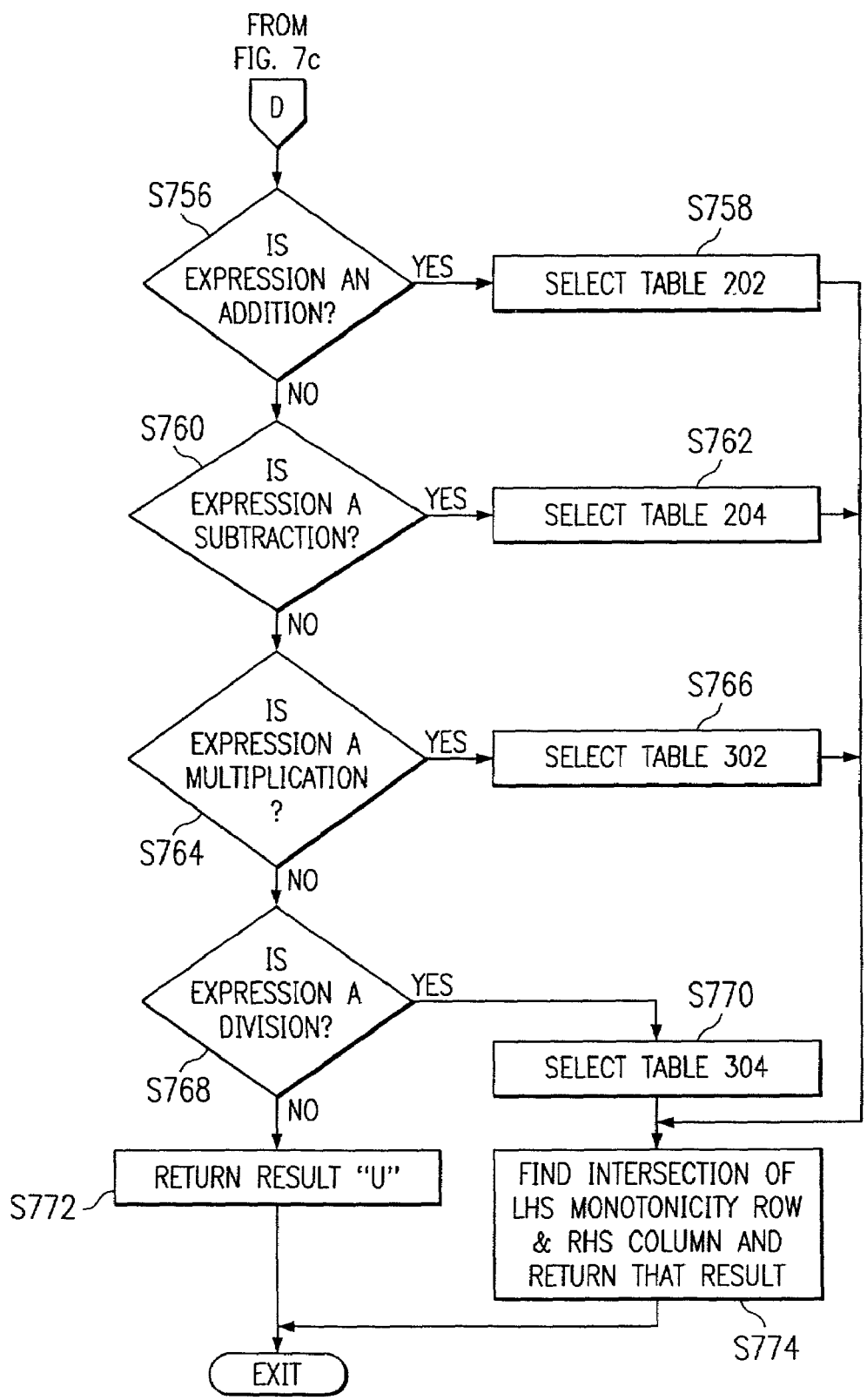

In FIG. 7e, the system processes a two-operand expression, that is, a binary operation. At step S756, the system tests whether the operator is an addition, and If Yes, at step S758 the system selects Table 202 to use for further testing at step S774. If No at step S756, the system tests at S760 whether the operator is a subtraction. If Yes, at step S762 the system selects Table 204 and proceeds to step S774. If No at step S762, the system tests at step S764 whether the operator is a multiplication. If yes, then at step S766 it selects Table 302 and proceeds to step S774. If No at step S764, the system tests at step S768 whether the operator is a division. If Yes, then at step S770 the system selects Table 304 and proceeds to step S774. If No at step S768, the system reports the result "U" at step S772, and exits. At step S774, the appropriate monotonicity lookup table has been selected as described above, and the system selects the row representing the Left Hand Side (LHS) monotonicity and then selects the column representing the RHS monotonicity and returns the result from the body of the table. The monotonicity function then exits.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for use in a database management system for generating a derived predicate from a selected database query, the query being made of a table containing at least one column generating expression, said method comprising:

(a) for each column and each simple equality predicate in the query, determining whether the predicate can be used together with an associated column generating expression to derive an additional predicate, deriving the additional predicate, adding the derived predicate to the query, and removing each predicate used in the derivation from a list of unexamined predicates;

(b) examining the monotonicity of the column generating expression if there is any remaining inequality predicate in the list of unexamined predicates;

(c) determining the type of derived predicate based on the monotonicity of the column generating expression for each remaining inequality predicate in the list of unexamined predicates; and (d) generating the resulting derived predicate from each of the remaining inequality predicates.

2. The method of claim 1, wherein the step of generating the resulting derived predicate from each of the remaining inequality predicates is performed using a conversion lookup table.

3. The method of claim 1, wherein steps (a) to (d) are performed for each of a plurality of column generating expressions in a database query.

4. The method of claim 1, wherein each IS NULL predicate generates an IS NULL derived predicate.

5. The method of claim 1, wherein all columns referenced in a column generating expression appear in equality predicates with constant values at the top level.

6. A computer program product comprising a computer readable storage device storing computer code means for use in execution in a computer, said code means being adapted to perform the methods of any of claims 1 to 5.

7. A database management computer system for generating a derived predicate from a database query, the query being made of a database table containing at least one column generating expression, the database management system comprising:
   (a) computer readable memory operatively connected to a data processing system; and
   (b) a module providing operation for directing said data processing system to:
      (i) for each column and each simple equality predicate in the query, determine whether the predicate can be used together with an associated column generating expression to derive an additional predicate, derive the additional predicate, add the derived predicate to the query, and remove each predicate used in the derivation from a list of unexamined predicates;
      (ii) examine the monotonicity of the column generating expression if there is any remaining inequality predicate in the list of unexamined predicates;
      (iii) determine the type of derived predicate based on the monotonicity of the column generating expression for each remaining inequality predicate in the list of unexamined predicates; and
      (iv) generate the resulting derived predicate from each of the remaining inequality predicates.

8. The database management system of claim 7, wherein the database table includes a plurality of column generating expressions.

9. A method for use in a database management system for generating a derived predicate from a database query containing at least one column generating expression, said method comprising:
   (a) reading a selected query statement;
   (b) selecting a column generating expression;
   (c) selecting a column;
   (d) selecting a first simple predicate in the column generating expression;
   (e) determining:
      (i) whether the first predicate is an IS NULL,
      (ii) whether the first predicate equates a constant value to a column,
      (iii) whether the first predicate is an inequality that connects the selected column to a constant,
      (iv) whether there is another inequality predicate associated with another column,
      (v) whether there is another inequality predicate associated with the selected column,
      (vi) whether there is an TN LIST predicate associated with another column,
      (vii) whether the first predicate is an IN LIST predicate associated with the selected column,
      (viii) whether there is an IN LIST predicate already associated with the selected column,
      (ix) whether there is an IN LIST predicate already associated with another column,
      (x) whether there is an inequality predicate already associated with another column,
      (xi) whether there is any column associated with an IS NULL predicate,
      (xii) whether any column is left unresolved, and
      (xiii) whether any unresolved column is associated with an IS NULL predicate,
   (f) setting the derived predicate to a calculated value based on the determinations in step (e); and
   (g) for each inequality predicate, determining the monotonicity status of the column generating expression referring to the column in the predicate by steps comprising using an inequality predicate lookup table related to the type of monotonicity of the generating expression, calculating constants, and generating a derived predicate.

10. A computer program product comprising a computer readable storage device storing computer code means including statements or routines for use in execution in a computer, said code means being adapted to perform the method of claim 9.

* * * * *

UNITED STATES PATENT AND TRADEMARK OFFICE
CERTIFICATE OF CORRECTION

PATENT NO. : 6,983,275 B2
DATED : January 3, 2006
INVENTOR(S) : Fred Koo et al.

It is certified that error appears in the above-identified patent and that said Letters Patent is hereby corrected as shown below:

Column 11,
Line 2, delete "expressions" and replace with -- expression --.

Column 20,
Line 11, delete "TN" and replace with -- IN --.

Signed and Sealed this

Twenty-eighth Day of March, 2006

JON W. DUDAS
*Director of the United States Patent and Trademark Office*